Feb. 16, 1965  R. C. WESTVEER  3,169,453
VALVE
Filed March 26, 1962
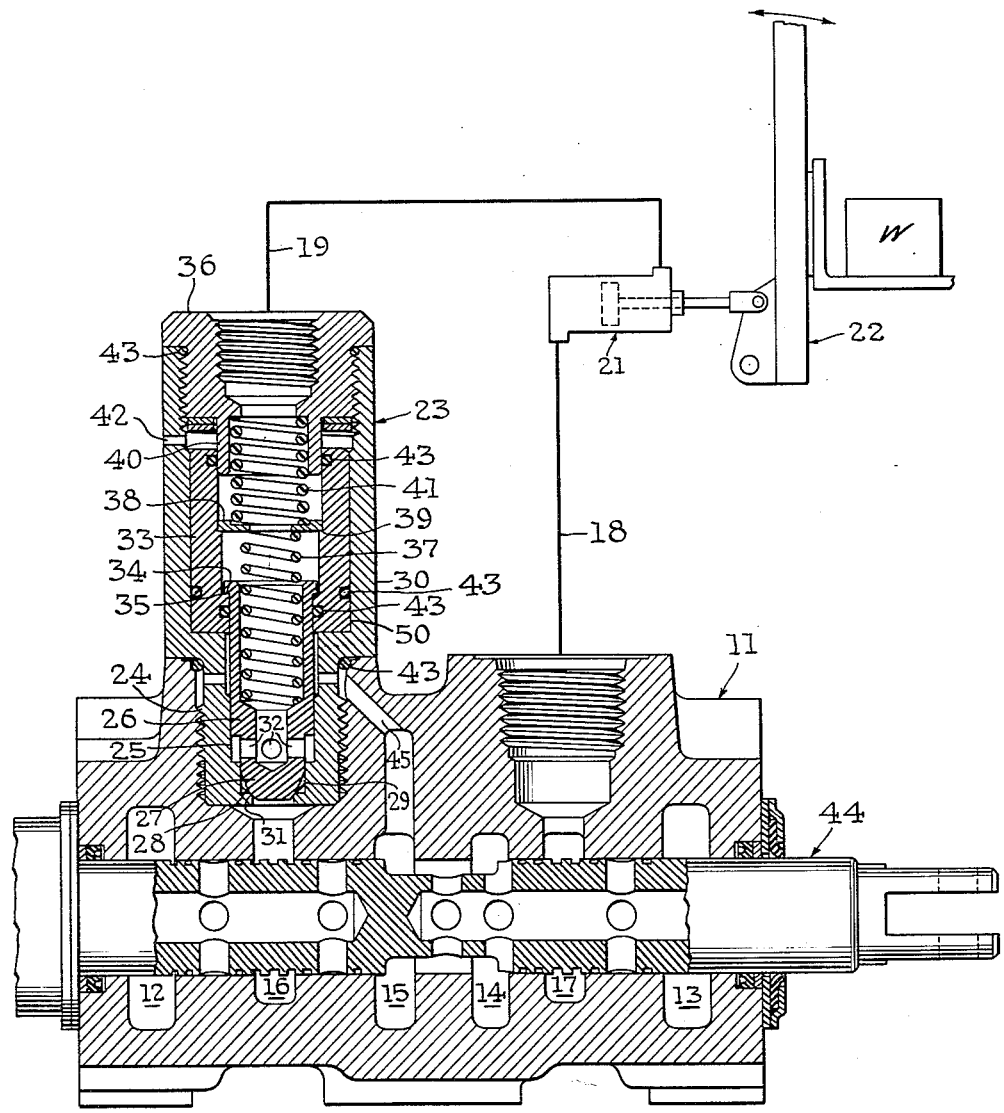
INVENTOR
Robert C. Westveer
BY Dodge and Sons
ATTORNEYS

# United States Patent Office 3,169,453
Patented Feb. 16, 1965

3,169,453
VALVE
Robert C. Westveer, Kalamazoo, Mich., assignor to The New York Air Brake Company, a corporation of New Jersey
Filed Mar. 26, 1962, Ser. No. 182,426
4 Claims. (Cl. 91—420)

This invention relates to flow control means. Particularly it concerns valve means intended to prevent cavitation in the expanding working space of a hydraulic double-acting motor by controlling the exhaust flow from the contracting working space in accordance with the pressure maintained in the expanding working space.

The invention relates to an anti-cavitation valve which is mounted in the connection between a directional control valve and one working space of a reversible motor controlled by that valve. Preferably, but not necessarily, the valve is mounted in the port opening in the control valve housing and may be mounted and removed quite simply.

The valve consists of a check valve, spring-biased toward a closed position in which it prevents flow from the contracting motor working space. A valve motor is provided which, when energized, will cause opening of the check valve against the bias of pressure in the contracting working space of the controlled motor. The pressure in the valve motor is a function of the pressure supplied to the expanding working space of the controlled motor. The area of the movable element of the valve motor is larger than the area of the valve seat and hence, a force adequate to open the valve is generated even though the pressure in the contracting working space may be equal to or higher than supply pressure before the check valve opens. The spring performs a graduating function, and the valve motor will open the check valve, against this graduated bias and against the pressure force exerted on the check valve, an amount which is a function of the difference between that pressure force and the pressure force applied to the valve motor by fluid supplied to the expanding motor space of the controlled motor. The pressure in the expanding working space varies with the load. This pressure, when low, will open the anti-cavitation valve in the exhaust connection only a relatively small amount so that the rate of exhaust flow will be limited. This will prevent a light load from being moved too rapidly. A similar low pressure in the expanding working space may also result when a heavy load starts to move rapidly or run away by reason of its acting to assist motor movement. Such movement may be so rapid that the pump cannot meet the demand and the cavitation will occur in the expanding working space. The control valve means of the invention will prevent such rapid movement and the resulting cavitation. The anti-cavitation valve will not inhibit reverse flow through the motor connection when the direction of motor movement is reversed. A second anti-cavitation valve may be provided in the other motor connection if cavitation might otherwise occur during reverse movement of the motor.

In the preferred embodiment, the motor-operated check valve is a poppet type valve. Such a valve seats positively, and therefore, the anti-cavitation valve possesses the added advantage that it affords a more positive seal when the control valve is in neutral position and the controlled motor is at rest.

The preferred embodiment of the invention will be described having reference to the accompanying drawing which shows the invention in place in a conventional control valve, the parts are shown in axial section. The drawing also includes a diagrammatic showing of a typical controlled motor on a small scale.

The control valve housing appears at 11. The valve bore therein is encircled by sump connected grooves 12, 13 and 14, supply groove 15, and motor grooves 16 and 17. Grooves 16 and 17 communicate with passages 18 and 19 through which fluid flows to and from the working spaces of a double-acting tilt motor 21 of a lift truck. The truck lift frame is schematically represented on a small scale at 22 and the load is carried on the forks as indicated at W.

The anti-cavitation valve of the present invention is shown at 23 and is located in the line 19 which communicates with the rod-end working space of tilt motor 21.

The valve 23 includes a generally cylindrical tubular housing 30 having a reduced diameter portion 24 the lower end of which is externally threaded and received in the tapped motor port of the control valve housing 11.

The housing 30 has a main internal valve bore portion 25 in which valve 26 is slidable. The valve 26 has a cylindrical skirt fitted to said bore and has a valve nose 27 having frusto-conical lower end 28. Throttling grooves 29 extend part way along this lower end, but terminate short of the line of engagement of the valve and the valve seat 31. The valve 26 is counterbored as shown. Cross-drilled ports 32 extend through the valve 26 between the counterbore and outer surface of the valve nose.

A larger diameter bore 50 is also formed in valve housing 30 and is coaxial with the bore 25. A sleeve piston 33 is slidable in bore 50 and is connected at its lower end with the skirt of valve 26. This connection is the one-way thrust connection afforded by shoulders 34 and 35. A centrally apertured cap 36 is threaded into the upper end of the valve housing 30 and includes a skirt 40 received in the sleeve piston 33.

A tandem spring assembly urges the valve 26 against its seat. The spring assembly comprises a light spring 37 confined between the valve 26 and spring seat 38 which is in turn biased against a stop or shoulder 39 on the inner surface of sleeve piston 33 by a graduating spring 41.

A vent 42 is provided for the chamber defined between the cap 36, sleeve piston 33 and housing 30. O rings 43 are mounted as shown to prevent leakage between the parts.

The control valve housing 11 includes a valve bore in which a valve plunger 44 is slidable. Plunger 44 is biased by a centering spring (not shown) to the illustrated position. It may be shifted to the left to interconnect motor groove 17 with the supply groove 15 and simultaneously to interconnect the motor groove 16 with sump connected groove 12 or it may be shifted to the right to interconnect motor groove 16 with the supply groove 15 and motor groove 17 with the sump-connected groove 13.

To tilt the frame back, i.e., to move it counter-clockwise about the pivot at its lower end, the control valve piston is shifted to the right. Valve 26 will move upward against the light bias of spring 37 which permits full flow through connection 19 to the rod-end working space of motor 21. Fluid will be exhausted from the other working space through the connection 18 and the control valve. No anti-cavitation protection is needed under these circumstances because the load opposes motor movement and hence will not cause the load to run away.

To tilt the frame forward the control valve is shifted to the left. This supplies fluid to the other working space of motor 21 and exhausts fluid from the rod end. During movement in this direction, however, the load acts to assist motor movement and heavy loads may, unless counteracted, cause the piston to cause fluid to exhaust at a rate greater than the pump can supply fluid. This condition results in impairment of load control and other objectional operating characteristics. The anti-cavitation valve of the present invention prevents this runaway in the following way. When the valve 44 is shifted to the left fluid at supply pressure is admitted to the bore 50 beneath the sleeve piston 33 through connection 45 and the radial ports in part 24 and biases the piston sleeve upward against the heavy bias of graduating spring 41 and against the bias of the pressure in line 19 acting on valve 26. Valve 26 will be thus opened permitting exhaust flow through the line 19. The valve 26 will open an amount depending upon the difference between the opposing forces created by the pressure acting on the annular piston surface and by the pressure in the line 19 acting on the valve. The valve seat area is smaller than that of the piston. Hence the unbalanced forces will assure initial movement of the valve in an opening direction. If the load W causes the piston to move more rapidly than the pump can supply fluid, the pressure in the supply groove 15 and beneath the sleeve piston 33 will fall and the graduating spring will move sleeve piston 33 downward, thereby permitting valve 26 to close partially or even completely. The valve 26 will assume an equilibrium position in which it will act to assure maintenance of a supply pressure in the expanding working space. The throttling grooves 29 in the surface of the valve nose will prevent abrupt closure of the anti-cavitation valve by creating a cushioning back pressure in the space in bore 25 beneath skirt of the valve 26.

The preferred embodiment of the invention has been described in detail, but the inventive concept is not limited to this precise structure.

What is claimed is:

1. For use in conjunction with a reversible, positive displacement motor and a reversing valve having a supply chamber and arranged to control said motor, an anti-cavitation valve interposed in one of the lines interconnecting the motor and the reversing valve comprising a housing having a bore extending therethrough; a valve seat in said bore; a skirted check valve member coacting with said valve seat; a relatively light spring urging the check valve toward the seat, said check valve opening against the spring bias to permit flow toward the motor; a sleeve piston slidable in a counterbore formed in the bore in said housing and encircling the skirt of the check valve; means providing one way thrust engagement between said sleeve piston whereby the check valve may be raised from its seat by said piston; a graduating spring, heavier than the check valve spring urging said sleeve piston toward a position in which said check valve is permitted to seat; a working space defined by the bore, the end of the sleeve piston, and the skirt, the area of the end face of the sleeve piston being larger than that of the valve seat; means to admit pressure from the supply chamber of the reversing valve to said working space; an annular plug carrying a cylindrical flange, said plug being received in the end of said counterbore with the flange extending into sealing engagement with said sleeve piston, said plug being adapted for connection to the line in which the anti-cavitation valve is interposed; and means providing a vent from the space defined by said housing, said plug and the sleeve piston.

2. The combination defined in claim 1 and damping means operatively associated with said check valve to cushion its closing movement.

3. The combination defined in claim 1 in which the check valve comprises a cylindrical body guided in the sleeve piston and having a bore extending inward from one end and having a frusto-conical valve end at the other end of said body, a reduced diameter portion on said body and separating the valve end from the remainder of the body and having transverse ports therethrough.

4. An anti-cavitation valve for interposition in a flow connection selectively serving as the supply or as the exhaust path of a reversible hydraulic motor comprising a valve housing; a passage through said housing for interposition in said flow connection; a valve seat in said passage; a check valve cooperating with said seat serving when closed to prevent exhaust flow through said connection; means biasing said check valve in closing direction; single-acting, fluid-pressure motor means having an effective area larger than that of the valve seat; one-way thrust means operatively connecting the motor means with the check valve whereby the check valve may be opened; graduating means biasing the motor means toward a position in which said check valve may close; and means to admit fluid under supply pressure to said motor means only when said connection is serving as the exhaust connection.

References Cited in the file of this patent
UNITED STATES PATENTS

| | | |
|---|---|---|
| 2,362,339 | Armington | Nov. 7, 1944 |
| 2,483,312 | Clay | Sept. 27, 1949 |
| 2,653,626 | Finlayson | Sept. 29, 1953 |
| 2,964,016 | Talak | Dec. 13, 1960 |
| 3,015,316 | Thomas | Jan. 2, 1962 |